United States Patent
Dabrowski et al.

(10) Patent No.: US 12,449,913 B1
(45) Date of Patent: Oct. 21, 2025

(54) SINGLE PHOTON AVALANCHE DIODES FOR ROTATIONAL AND TRANSLATIONAL INPUT DETECTION

(71) Applicant: Apple Inc., Cupertino, CA (US)

(72) Inventors: Mieczyslaw M Dabrowski, San Francisco, CA (US); Anand K Chamakura, San Jose, CA (US); Dong Zheng, Los Altos, CA (US); Peng Zhao, Redwood City, CA (US); David D Dashevsky, San Jose, CA (US); Stephen N Sweet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/892,374

(22) Filed: Sep. 21, 2024

(51) Int. Cl.
*G06F 3/03* (2006.01)
*G01D 5/347* (2006.01)
*G06F 1/16* (2006.01)

(52) U.S. Cl.
CPC ......... *G06F 3/0312* (2013.01); *G01D 5/3473* (2013.01); *G06F 1/163* (2013.01); *G06F 3/0325* (2013.01)

(58) Field of Classification Search
CPC .............. G01D 5/34715; G01D 5/3473; G06F 3/0312; G06F 3/0362; G06F 3/0325; G06F 1/163
See application file for complete search history.

(56) References Cited

U.S. PATENT DOCUMENTS

| | | | |
|---|---|---|---|
| 11,109,135 B1 | 8/2021 | Corona Aparicio et al. | |
| 11,112,494 B2 | 9/2021 | Shimizu et al. | |
| 11,432,766 B2 | 9/2022 | Pandya et al. | |
| 11,644,800 B2 | 5/2023 | Holenarsipur et al. | |
| 2016/0258784 A1* | 9/2016 | Boonsom | G01D 5/34715 |
| 2019/0317454 A1* | 10/2019 | Holenarsipur | G04C 3/005 |
| 2023/0171503 A1* | 6/2023 | Braley | G01S 7/497 |
| | | | 348/148 |

FOREIGN PATENT DOCUMENTS

| | | |
|---|---|---|
| CN | 215986915 U | 3/2022 |
| CN | 115560702 A | 1/2023 |
| CN | 115718201 A | 2/2023 |
| CN | 219179427 U | 6/2023 |
| CN | 117119328 A | 11/2023 |
| WO | WO-2021125018 A1 | 6/2021 |

\* cited by examiner

*Primary Examiner* — Hang Lin
(74) *Attorney, Agent, or Firm* — Brownstein Hyatt Farber Schreck, LLP

(57) ABSTRACT

An input component for an electronic device configured to detect rotational and/or translational movement of a surface. In an implementation, the input component includes a movable input member with a shaft with a pattern disposed on its surface. A light-emitting element is positioned to direct light towards this pattern, a portion of which is thereafter reflected back. An imaging system is situated to capture the reflected light. The imaging system includes an array of single-photon avalanche diodes (SPADs) operating in Geiger mode. This array is coupled with a counter circuit, which increments one or more values based on the SPAD array output. These values and corresponding SPAD locations within the array can be correlated to the spatial phase of the reflected light, which in turn can be converted to rotational or axial displacement of the movable input member.

20 Claims, 6 Drawing Sheets

SINGLE PHOTON AVALANCHE DIODES FOR ROTATIONAL AND TRANSLATIONAL INPUT DETECTION

TECHNICAL FIELD

Embodiments described herein relate to electronic device user input sensors and, in particular, to mechanical user input systems configured to detect at least one of rotational or translational input.

BACKGROUND

Electronic devices can include an input component to receive mechanical user input, such as a press, a rotation, or a translation. Example input components include physical buttons, depressible keys, and rotatable drums or dials. Legacy mechanical user input devices, such as buttons, keys, or potentiometers (whether linear or rotary) typically provide analog electronic input to circuits of an electronic device by closing a switch or changing a resistance, inductance, or capacitance of one or more circuit elements in proportion to a user's mechanical input. More modern conventional mechanical user input devices, such as dials or rotatable drums, often include magnetic or optical position encoders that, in turn, are coupled to digital circuits or processors of an electronic device.

However, as electronic device form factors become more compact, conventional and legacy mechanical input systems in many cases are required to sacrifice resolution and/or responsiveness to accommodate component size constraints. In other cases, mechanical input systems are entirely omitted in favor of small size electronic input components, such as capacitive sensors, that do not provide any haptic or tactile feedback to a user.

SUMMARY

Embodiments described herein relate to input components for portable electronic devices. The input components may be mechanically engaged by a user of the electronic device to provide input to the electronic device. In particular, an input component for a portable electronic device can include a movable input member with a shaft that may have a spatially-varying pattern disposed on an exterior surface thereof.

An input component as described herein can include a light-emitting element oriented to emit light toward the pattern, which is then reflected as reflected light patterned in a manner based on the spatially-varying pattern. The input component further includes an imaging system which is defined at least in part by an array of single-photon avalanche diodes (SPADs) configured to operate in Geiger mode.

The array is disposed, oriented, and/or positioned to receive the reflected light, having been patterned according to the spatially-varying pattern of the movable input member. A counter circuit can be coupled to at least one SPAD of the array, and configured to increment and/or iterate a value in response to the output of the SPAD. This value informs determination, by a processor or other circuit element or combination of circuit elements, of the spatial phase of the reflected light which in turn can be correlated to a magnitude of rotation and/or translation of the shaft of the movable input member.

In some embodiments, the portable electronic device may be a wearable electronic device such as a wrist-worn smart watch or a head-mounted display. In these examples, the input component may be a crown or dial configured to receive a mechanical user input, such as a rotation, a press (e.g., translation), a tilt, or any other mechanical input or combination thereof.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
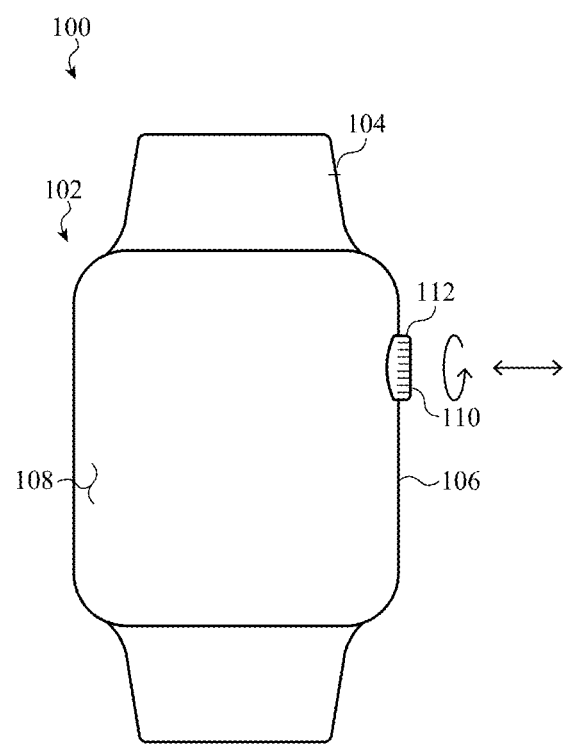
FIG. 1 depicts an electronic device including an input component as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Certain accompanying figures include vectors, rays, traces and/or other visual representations of one or more example paths—which may include reflections, refractions, diffractions, and so on, through one or more mediums—that may be taken by, or may be presented to represent, one or more photons, wavelets, or other propagating electromagnetic energy originating from, or generated by, one or more light sources shown or, or in some cases, omitted from, the accompanying figures. It is understood that these simplified visual representations of light or, more generally, electromagnetic energy, regardless of spectrum (e.g., ultraviolet, visible light, infrared, and so on), are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to input components for electronic devices and, in particular, to imaging subsystems of compact input components for small form factor portable electronic devices. In particular, imaging subsystems described herein are configured to instrument a movable input member of an input component so as to optically detect displacement, translation, rotation, or other physical changes in position or orientation of the movable input member. Magnitude and direction of these detected changes can be interpreted as user input, sensor input, or in any other suitable way by a processor of the input component and/or a processor of the electronic device.

As an example, an electronic device as described herein can include a button (i.e., an "input component") configured to move inwardly in respect of a housing of the electronic device in response to an application of pressure to an exterior surface (e.g., button cap) of the button by a user of the electronic device. As a body of the button moves, a portion of the button can be monitored by an imaging subsystem of the button. By comparing successive images and/or tracking changes in individual pixel values, the imaging system can determine, infer, or calculate a distance traveled by the button in response to the application of pressure to the button cap by the user.

As an example, output from the imaging subsystem can be used to determine whether the button has moved at least a threshold distance to trigger an action (e.g., a processor interrupt). This example interprets output of the imaging subsystem to generate a binary value, but this is not required of all embodiments. In some cases, distance traveled by the button (which in some cases can imply an amount of force applied to the button) may be used by the electronic device for nonbinary user input (e.g., volume adjustment, brightness adjustment, menu selection, scrolling, and so on).

As another example, an electronic device as described herein can include a dial (i.e., an "input component") configured to rotate relative to a housing of the electronic device in response to an application of torque to an exterior surface of the dial by a user of the electronic device. As an axis of the dial rotates, a portion of the axis can be monitored by an imaging subsystem of the dial. By comparing successive images and/or tracking changes in individual pixel values, the imaging system can determine, infer, or calculate an angular displacement of the dial in response to the application of torque to the dial by the user. As with other examples described herein, rotation or angular output (and/or derived properties such as speed, angular acceleration, and the like) can be leveraged by a processor of the dial and/or a processor of the electronic device for any suitable user input or rotation encoding purpose. In some examples, such as for electronic devices worn on a wrist, a dial input component may be referred to as a "crown."

In yet another example, a dial or crown as described above may also be configured to translate in one or more directions and/or along one or more axes in addition to rotation. In these embodiments, as the axis of the dial rotates and/or translates and/or pivots, a portion of the axis can be monitored by an imaging subsystem of the dial or crown. By comparing successive images and/or tracking changes in individual pixel values, the imaging system can determine, infer, or calculate an angular displacement of the dial in addition to a translational displacement of the dial in response to an application of torque and/or pressure to the dial by a user. In many embodiments, the tracking and/or determination of position by an imaging system or subsystem as described herein can be referred to as determining a "spatial phase" of the movable input element.

Embodiments described herein can provide significantly improved movement and rotation detection resolution when compared to conventional analog instrumentation of movable members, such as tactile switches, resistive wipers, and so on, while significantly reducing size requirements. More simply, embodiments described herein can be manufactured to occupy significantly reduced volume in comparison to both legacy solutions (e.g., conventional switches and encoders) and more contemporary conventional solutions (e.g., magnetic field sensing, capacitive field sensing, complementary metal oxide semiconductor-based (CMOS) imaging solutions).

Further, certain embodiments described herein can be formed as purpose-configured integrated circuits, further increasing packaging and volumetric efficiency.

Moreover, many input components and imaging subsystems thereof as described herein can be implemented with significantly simplified circuitry and/or microprocessor design. In particular, embodiments described herein can omit expensive and power-consuming components, such as analog to digital converter circuits, further improving volumetric efficiency, power use efficiency, and component cost without sacrificing performance.

Further still, many input components and imaging subsystems thereof as described herein can operate at significantly higher frame rates when compared to conventional CMOS or other position-detecting imaging systems, thereby offering improved high-speed rotation and/or translation detection.

Broadly, imaging subsystems as described herein are configured to project light from a light source onto a movable or rotatable surface of a movable member of an input component. This light thereafter reflects from the movable member onto a two-dimensional single photon avalanche diode (SPAD) array. Each SPAD of the array is operated in Geiger mode (e.g., biased to breakdown voltage) and can be coupled either directly or via a multiplexing sampling circuit to a corresponding analog frontend input feeding a pulse counter, counter circuit, or similar circuit.

As a result of these constructions, a two-dimensional reflection of the movable member is projected, by the light source, onto the SPAD array which in turn provides, as output, an image of that reflection in which each "pixel" corresponds to a respective count of avalanche events detected in a given time period by a respective one SPAD of the array.

In this manner, a set of successive images (or, more broadly, any suitable digital data structure storing counts in respect of each pixel over the course of a selected period of time) encodes changes in spatial phase information corresponding to movement, translation, and/or rotation of the movable input member itself. For example, a processor or processing circuit can be operably coupled to the SPAD array and can be configured to determine direction and magnitude of displacement over time of the projected image, which thereafter may be provided as digital or analog output to another circuit, such as to an interrupt input of a processor of the electronic device incorporating the input component.

An example movable input member as described herein can be a shaft of a crown of a wearable electronic device such as a wrist-worn watch. It may be appreciated, however, that this is merely one example. Other input members may be associated with keys, toggles, button caps, movable displays, sliding input elements, or any other suitable movable, translatable, rotatable, repositionable, or otherwise non-fixed input component that may be incorporated by an electronic device. For simplicity of description and illustration the embodiments described herein are presented in view of an example implementation in which an input component is implemented as a crown of a wrist-worn watch. The crown includes a movable input member that is a shaft about which the crown rotates. The imaging subsystem can be positioned below the shaft and within a housing of the wrist-worn watch so as to project light onto the shaft. It may be appreciated that this is merely one example configuration.

As noted above, in an embodiment, a crown as described herein includes a shaft that is disposed and supported at least partially within a housing of the wearable electronic device. In some embodiments, the shaft may extend partially or entirely through a dedicated or shared aperture defined through a sidewall of the housing, but this is not required of all embodiments. The shaft may be mechanically coupled, either directly or indirectly, to a component that may be directly manipulated by a user, such as a textured exterior surface of the crown.

As a user applies a torque to the exterior surface of the crown, the shaft likewise rotates a corresponding amount. As the shaft rotates, light projected onto the shaft reflects a pattern onto a SPAD array. The pattern spatially translates and/or deforms over the SPAD array in a manner proportional to translation and rotation of the crown by the user. As a result, pulse-count output from the SPAD array can be leveraged directly as digital data, without requiring amplification, quantization, or other analog to digital conversion stages, delays, or components.

Further embodiments can include, as examples, one or more masked SPAD sensors used to determine dark count rates that, in turn, can be used to correct output from unmasked SPAD sensors (referred to as "dark count offset correction"). In some examples, the masking can be patterned over an imaging area of the SPAD array, whereas in other examples, the masking can be disposed over a perimeter portion or a non-imaging region of the array. Many configurations are possible. For example, in some cases, masked SPAD elements can be used to adjust/configure power output of the light emitting element in real time.

In some embodiments and/or applications, digital binning may be used to form arbitrarily sized pixel groups. More specifically, counts from multiple SPADs can be combined to represent a single "super"-pixel. In some cases, digital binning may be configurable; in some cases, different performance requirements may permit or prefer digital binning to be enabled, whereas in other cases higher resolution (e.g., binning disabled) may be required or preferred.

In some cases, an analog binning effect may be achieved by applying a mask over the SPAD array. In these examples, the mask may define an arbitrary shape that entirely covers certain SPAD elements, partially covers certain SPAD elements, and does not cover any portion of certain SPAD elements.

These foregoing and other embodiments are discussed below with reference to FIGS. 1-6. However, those skilled in the art will readily appreciate that the detailed description given herein with respect to these figures is for explanation only and should not be construed as limiting.

FIG. 1 depicts an example electronic device that can include an input component as described herein. The input component can include an imaging subsystem configured to monitor and characterize translation, rotation, and/or other positional or orientational changes to the input component or a portion thereof. The electronic device 100 is depicted as a wearable electronic device, but it may be appreciated that this is merely one example construction. In other cases, an input component and corresponding imaging subsystems can be incorporated at other scales, within other electronic devices—portable, wearable, or otherwise.

The electronic device 100 may include a body 102 (e.g., a watch body). The body 102 may include an input component, such as a crown or a button. A band 104 may be attached to a housing 106 of the body 102 and may be used to attach the body 102 to a body part (e.g., an arm, wrist, leg, ankle, or waist) of a user.

The housing 106 can at least partially surround, support, and/or include a display 108. In some embodiments, the housing 106 may include a sidewall or annular frame which may support a front cover and/or a back cover. The front cover may be positioned over the display 108 and may provide a window through which the display 108 may be viewed by a user/wearer of the electronic device 100. In some embodiments, the display 108 may be attached to (or abut) the sidewall and/or the front cover. In alternative embodiments of the electronic device, the display 108 may not be included and/or the housing may have an alternative configuration.

The display 108 may include one or more light-emitting elements including, for example, light-emitting elements that define a light-emitting diode (LED) display, organic LED display, liquid crystal display, electroluminescent display, or other type of display. In some embodiments, the display 108 may include, or be associated with, one or more touch and/or force sensors that are configured to detect a touch and/or a force applied to a surface of the front cover.

In some embodiments, the sidewall of the housing 106 may be formed using one or more metals (e.g., aluminum or stainless steel), polymers (e.g., plastics), ceramics, or composites (e.g., carbon fiber). The front cover may be formed, for example, using one or more of glass, a crystal (e.g., sapphire), or a transparent polymer (e.g., plastic) that enables a user to view the display 108 through the front cover. In some cases, a portion of the front cover (e.g., a perimeter portion of the front cover) may be coated with an opaque ink to obscure components included within the housing. In some cases, all of the exterior components of the housing 106 may be formed from a transparent material, and components within the electronic device 100 may or may not be obscured by an opaque ink or opaque structure within the housing 106.

The back cover may be formed using the same material(s) that are used to form the sidewall or the front cover. In some cases, the back cover may be part of a monolithic element that also forms the sidewall. In other cases, the back cover may be a multi-part back cover, such as a back cover having a first back cover portion attached to the sidewall and a second back cover portion attached to the first back cover portion. The second back cover portion may in some cases have a circular perimeter and an arcuate exterior surface. The front cover, back cover, or first back cover portion may be mounted to the sidewall using fasteners, adhesives, seals, gaskets, or other adhering or fastening components. The second back cover portion, when present, may be mounted to the first back cover portion using fasteners, adhesives, seals, gaskets, or other components.

A display stack (hereafter referred to as a "stack") including the display 108 may be attached (or abutted) to an interior surface of the front cover and extend into an interior volume of the electronic device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover (e.g., to a display 108 surface of the electronic device 100).

In some cases, a force sensor (or part of a force sensor system) may be positioned within the interior volume below and/or to the side of the display 108 (and in some cases within the electronic device stack). The force sensor (or force sensor system) may be triggered in response to the touch sensor detecting one or more touches on the front cover (or a location or locations of one or more touches on the front cover), and may determine an amount of force associated with each touch, or an amount of force associated with the collection of touches as a whole. The force sensor (or force sensor system) may alternatively trigger operation of the touch sensor (or touch sensor system) or may be used independently of the touch sensor (or touch sensor system).

The electronic device 100 may include various sensors. In some embodiments, the electronic device 100 may have a port (or set of ports) on a side of the housing (or elsewhere), and an ambient pressure sensor, ambient temperature sensor, internal/external differential pressure sensor, gas sensor, particulate matter concentration sensor, or air quality sensor may be positioned in or near the port(s).

In some cases, one or more skin-facing sensors may be included within the electronic device 100. The skin-facing sensor(s) may emit or transmit signals through the housing 106 (or back cover) and/or receive signals or sense conditions through the housing 106 (or back cover). For example, in some embodiments, one or more such sensors may include a number of electromagnetic radiation emitters (e.g., visible light and/or IR emitters) and/or a number of electromagnetic radiation detectors (e.g., visible light and/or IR detectors, such as any of the electromagnetic radiation detectors described herein).

The sensors may be used, for example, to acquire, sense, or otherwise characterize biological information from the wearer or user of the electronic device, or to determine a status of the electronic device 100 (e.g., whether the electronic device 100 is being worn or a tightness of the band 104 coupling the electronic device 100 to a user thereof).

The electronic device 100 may include circuitry (e.g., a processor and/or other components) configured to determine or extract, at least partly in response to signals received directly or indirectly from one or more of the sensors, and by way of example, biological parameters of the user, an input provided by the user, a status of the electronic device 100 or its environment, and/or a position (or other aspects) of objects, particles, surfaces, or a user.

In some embodiments, the circuitry may be configured to convey the determined or extracted parameters, inputs, or statuses via an output electronic device of the electronic device 100. For example, the circuitry may cause the indication(s) to be displayed on the display 108, indicated via audio or haptic outputs, transmitted via a wireless communications interface or other communications interface, and so on. The circuitry may also or alternatively maintain or alter one or more settings, functions, or aspects of the electronic device 100, including, in some cases, what is displayed on the display 108.

As noted above, the electronic device 100 can also include one or more physical input components configured to be mechanically manipulated by a user. In the illustrated embodiment, the electronic device 100 includes the input component 110, which is implemented as a rotatable crown. In some configurations, the input component 110 can also be pressed or pulled or tilted (e.g., used as a directional input, such as a joystick) by a user of the electronic device 100 to provide input to the electronic device 100. More particularly, the electronic device 100 can provide output that may be received by a processor of the electronic device 100 as a hardware interrupt. In other cases, the processor (or another dedicated circuit or combination of circuits) can be configured to periodically poll a state of the input component 110 to determine whether a user input has been received (and thus the state has changed).

As with other embodiments described herein, the input component 110 of the electronic device 100 can include one or more imaging subsystems that include a light emitting element (or an array thereof) and a SPAD array. The SPAD array can be of any suitable size; in many embodiments, although not required, the array is two-dimensional, having a length and a width and/or a count of independent diodes in each of two dimensions. In other cases, a single row or column of SPADs may be suitable. Different embodiments may include different numbers of diodes. In some cases, the diodes can be the same size, whereas in other cases, the diodes may be different sizes throughout the array. In some cases, the diodes may be arranged in a grid, in other cases, the diodes may be arranged in a particular pattern. Many configurations are possible.

As noted with respect to other embodiments described herein, the imaging subsystem can be positioned within the housing 106 so as to illuminate a portion of the input component 110 that extends within the housing 106. Specifically, the imaging subsystem can be configured to illuminate a movable member of the input component 110.

For example, in some embodiments, the input component 110 may be a crown of a watch. The crown can be configured to rotate about an axis defined through a shaft that extends from a drum defining a user input surface, such as the user input surface 112. More broadly, in this construction, the shaft is a movable member. In this construction, a user can apply a torque to the input component 110 by rotating the user input surface 112 which, in turn, causes the shaft (not shown) to rotate. Rotation of the shaft (the movable member) causes the reflection of the shaft's surface onto the SPAD array to spatially translate in one or more directions corresponding to the rotation.

In these embodiments, the shaft may be supported, at least in part, by the housing 106 through which the shaft extends, or by a support member, sleeve, or bearing through which the shaft extends, or by a support member that cradles or otherwise supports the shaft. The light emitting element(s) of the imaging subsystem and the SPAD array of the imaging subsystem may be supported by the same housing parts or features (e.g., apertures), that support the shaft, or by a different housing, or by a printed circuit board, flexible circuit, or other structure to which the light emitting element(s) of the imaging subsystem and the SPAD array of the imaging subsystem are attached.

As noted above, the shaft which in some cases may be part of the input component 110 may be rotatable and translatable with respect to an axis of rotation. For example, the shaft may rotate about the axis of rotation and translate along the axis of rotation. The shaft may have a circumference and an optical encoder pattern (e.g., an engineered optical surface) disposed around the circumference. The surface pattern may be intentionally reflective or absorptive.

The light emitting element(s) of the imaging subsystem and the SPAD array of the imaging subsystem may be provided as a module but may alternatively be separately provided and disposed within a single module housing. For simplicity of description, the embodiments that follow reference a configuration in which the imaging subsystem is provided as a single module.

The module can include a housing, and the housing may, in some embodiments, include a light blocking wall. In embodiments that include the light blocking wall, the light emitting element(s) of the imaging subsystem and the SPAD array of the imaging subsystem may be carried by the housing and positioned on opposite sides of the light blocking wall. The light blocking wall may reduce optical crosstalk between the light emitting element(s) of the imaging subsystem and the SPAD array of the imaging subsystem and help ensure that electromagnetic radiation emitted by the light emitting element(s) of the imaging subsystem impinges on the optical encoder pattern of the shaft before impinging on the SPAD array.

In some embodiments, the module may be attached to a printed circuit board, flexible circuit, or other substrate. In some embodiments, the light emitting element(s) of the imaging subsystem and the SPAD array of the imaging subsystem may be separately attached to a printed circuit board, flexible circuit, or other substrate. The light emitting element(s) of the imaging subsystem and the SPAD array of the imaging subsystem may be disposed along a sensing axis that is orthogonal (or transverse) to the axis of rotation.

The light emitting element(s) of the imaging subsystem may be positioned and oriented to emit electromagnetic radiation toward the optical encoder pattern of the shaft. In some embodiments, the electromagnetic radiation includes infrared (IR) electromagnetic radiation, though the electromagnetic radiation may additionally, or alternatively, include other wavelengths of electromagnetic radiation.

In some embodiments, the light emitting element(s) of the imaging subsystem may include a wide angle and incoherent light emitting element(s) of the imaging subsystem, such as a light-emitting diode (LED), though the light emitting element(s) of the imaging subsystem may also include a laser diode with one or more lensing elements, diffusers, or other optical elements or another type of light emitting element(s) of the imaging subsystem.

The SPAD array may be configured (e.g., positioned and oriented) to receive reflections of the emitted electromagnetic radiation from the optical encoder pattern and generate an irradiance pattern in response to the reflections. The SPAD array may include a two-dimensional (2D) array of pixels, each defined by one or more individual SPAD elements. In some embodiments, the array of pixels may be a 4×2, 4×4, 8×4, or 8×8 array of pixels. In other cases, the array can include any arbitrary number of diodes in length and any arbitrary number of diodes in width. Movements or changes in the irradiance pattern along the first dimension may be primarily used to determine a rotation of the shaft. Movements or changes in the irradiance pattern along the second dimension may be primarily used to determine a translation of the shaft, such as pulling in or pushing out.

These foregoing embodiments depicted in FIG. 1 and the various alternatives thereof and variations thereto are presented, generally, for purposes of explanation, and to facilitate an understanding of various configurations and constructions of an input component and electronic device, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
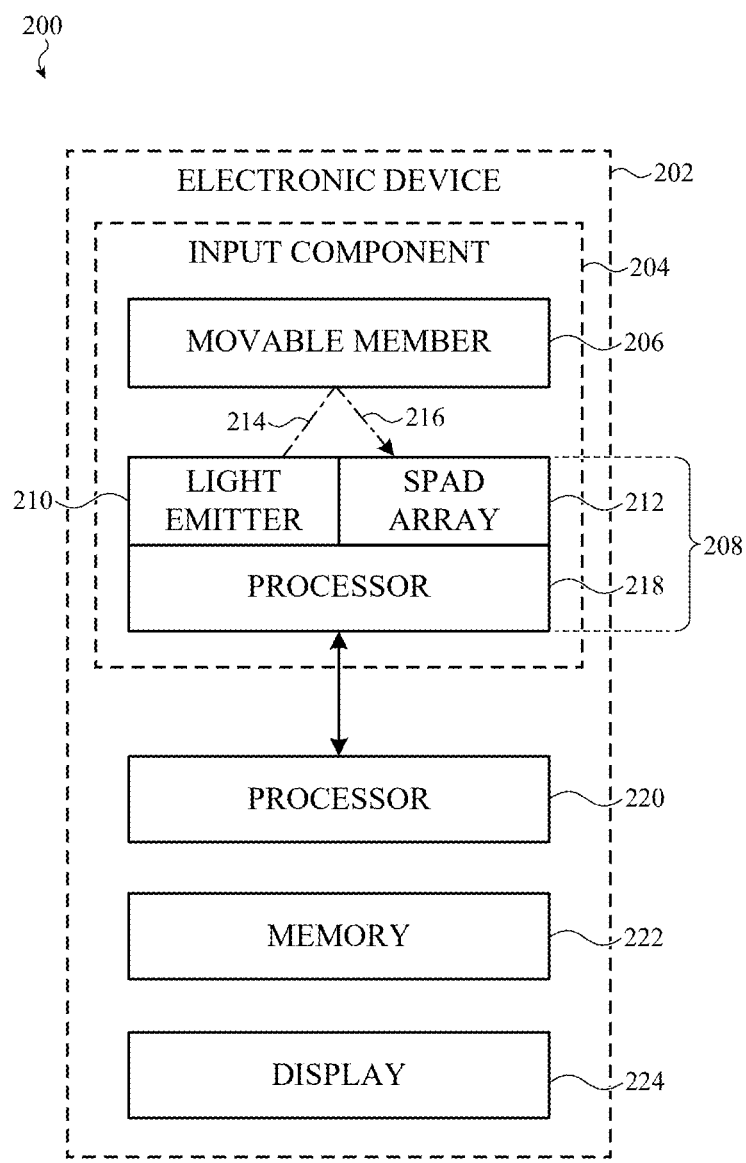
FIG. 2 depicts a system diagram of an electronic device including an input component as described herein.

FIG. 2 depicts a system diagram of an input system 200 including an electronic device with an input component, in turn including a movable member positioned above an imaging subsystem as described herein.

In particular, the input system 200 includes an electronic device 202, which can be a wearable electronic device such as a watch. Internal components of the electronic device 202 are enclosed and supported by a housing. Within the housing is disposed an input component 204. The input component 204 is configured to mechanically move in response to an application of force or torque by a user operating, handling, or otherwise engaging with the electronic device 202. In some examples, the input component 204 can include an input surface configured to encourage a user to rotate a movable part of the input component 204. For example, the input component 204, implemented as a crown of a smart watch, can include a drum portion with knurling to encourage a user to apply a torque thereto, to cause the drum to rotate/

The input surface of the movable part of the input component 204 can be mechanically coupled, either directly or indirectly, to a movable member 206. The movable member 206 can be any suitable surface or element of the input component 204, but in many examples, the movable member 206 is a shaft about which a crown of a smart watch can rotate.

The movable member 206 can include an irregular or repeating surface pattern which may be etched, printed, stamped, or otherwise disposed thereon. In some cases, the surface pattern many be reflective, whereas in other cases, the surface pattern may be partially absorptive.

Positioned adjacent to the movable member 206 is an imaging subsystem 208, such as described above. The imaging subsystem 208 includes a light emitting element 210 and a SPAD array 212. The light emitting element 210 may be one or more light emitting diodes, laser elements, or any other suitable light emissive element. In some cases, the light emitting element 210 is configured to emit visible light, whereas in others, the light emitting element 210 is configured to emit infrared light.

The SPAD array 212 includes multiple SPAD elements arranged in a pattern or grid. Each of the individual SPAD elements can be conductively coupled to a voltage source and/or regulated voltage source so as to maintain each diode at, above, or near breakdown bias levels. In some cases, breakdown voltages may differ for individual SPAD elements; in these examples, individual SPAD elements may receive different voltages to operate in Geiger mode. In other cases, each individual SPAD element of the SPAD array 212 can be driven to the same potential.

Each SPAD element of the SPAD array 212 can be coupled to an analog circuit configured to provide, as output, a pulse in response to occurrence of an avalanche event induced at the respective SPAD. For example, in some cases, the analog circuit can include a voltage offset, a level shifter, one or more enable and/or disable controls, and/or one or more amplification stages. Output of the analog circuit can be, functionally, a digital impulse train that can be coupled to a counter circuit (e.g., a series of flip-flops) to convert the impulse train into a digital value that increments or iterates a digital value as output; the counter circuit can be, in many cases, reset to zero after a timeout period, after a timeout period during which no further impulse was detected, on a schedule, or in response to a signal from a controller circuit, processor, or other analog circuit. As a result of this construction, transimpedance amplification and analog to digital conversion required of legacy and conventional systems (e.g., CMOS imaging systems) is not required.

More generally, the light emitting element 210 can be configured to emit light as the emitted light 214. The emitted light 214 is directed toward the movable member 206 over one or more light-blocking features or barriers that prevent the emitted light 214 from impinging upon the SPAD array 212 directly. As a result of this architecture, the emitted light 214 reflects from the movable member 206 and projects an image of the movable member 206 as the projected reflection 216 onto the SPAD array 212.

The SPAD array 212 can be coupled to and/or formed onto a processor 218. The processor 218 can be configured to receive output from the SPAD array 212 and to track the spatial phase of images received by the SPAD array 212. For example, as the movable member 206 rotates, an image captured by the SPAD array 212 of the projected reflection 216 may shift along an axis of the SPAD array 212. By monitoring frame-by-frame, or pixel by pixel, the processor 218 can determine a direction and magnitude of the translation of the image which, in turn, can be correlated to a rotation or translation of the movable member 206.

In this manner a user input provided to the movable member 206 can be output from the input component 204 and provided as input to a processor of the electronic device 202, identified in FIG. 2 as the electronic device processor 220. The electronic device processor 220 can receive output from the input component 204 as an interrupt or may be configured to poll the input component 204 for changes in direction and/or magnitude of user input.

The input component 204 can be configured to provide output in any suitable form or format. In some cases, a pin of the input component 204 can provide an analog output, such as a varying voltage or frequency, that corresponds to an angle of rotation of the input component 204. In other cases, the input component 204 can provide digital output either serially or via one or more input/output pins. In other cases the input component 204 can provide output that conforms with one or more data transfer protocols such as Universal Serial Bus, I2C, or serial communication.

The electronic device processor 220 can leverage output from the input component 204 for any suitable user input purpose, as noted above. For example, in some cases the electronic device processor 220 includes an electronic device memory 222 that operates with the electronic device processor 220 to instantiate an instance of software that renders a graphical user interface over an electronic device display 224. In this example, the graphical user interface can be changed, modified, or updated in proportion to and/or in response to output received form the input component 204.

These foregoing embodiments depicted in FIGS. 1-2 and the various alternatives thereof and variations thereto are presented, generally, for purposes of explanation, and to facilitate an understanding of various configurations and constructions of an input component and an imaging subsystem thereof, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3A:
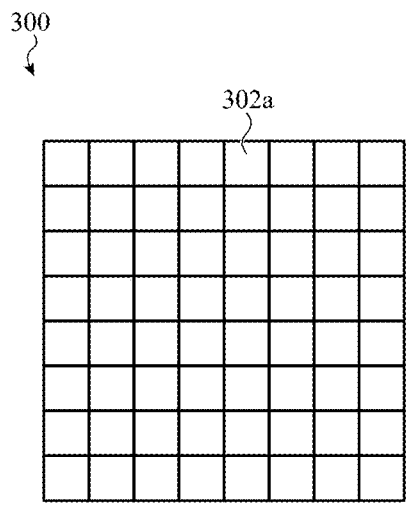
FIGS. 3A-3C depict example arrays of single photon avalanche detectors that can be used with an imaging subsystem of an input component as described herein.
Figure 3B:
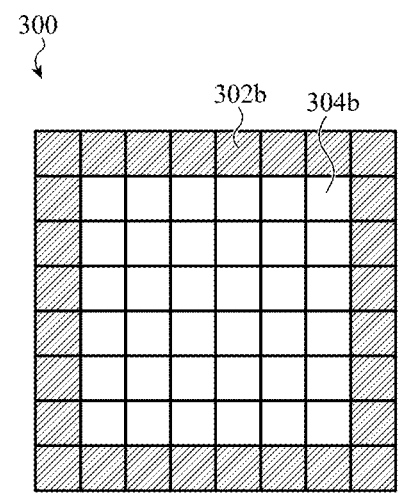

For example, some imaging system embodiments may configure arrays of SPAD elements differently. For example, FIG. 3A depicts an example array, the SPAD array 300, including 8×8 individual elements, with a square aspect ratio. Among the sixty-four individual SPAD elements, one is identified as the sensing diode 302a. In this example, all elements of the SPAD array 300 are uncovered/exposed and may be used for imaging operations. By contrast, FIG. 3B depicts an arrangement of SPAD elements, the SPAD array 300, in which a perimeter of the array is masked by disposing a light-opaque material over the SPAD array. In particular, in this construction, some of the SPAD elements, including the masked diode 302b, are masked and should never breakdown (i.e., counts should be zero) whereas other SPAD elements, including the sensing diode 304b are unmasked and may be used for sensing.

In many cases, the masking can be formed form a metal layer disposed over certain elements of the SPAD array 300. In other cases, the masking includes ink, a silvering layer, a plastic backing, or any other suitable opaque material.

In this construction, the masked diode 302b can still be driven toward its breakdown voltage to operate in Geiger mode. However, because of the masking, no photons should trigger breakdown/avalanche. As known to a person of skill in the art, however, the masked diode 302b may still provide spontaneous outputs that may be counted. A system as described herein can be configured, in one mode, to ignore outputs from masked SPAD elements, while in another mode leveraging those outputs to calibrate count outputs from other, non-masked SPAD elements. For example, an output count from a counter circuit coupled to a masked diode, such as the masked diode 302b, may be used as a calibration, baseline, or bias for sensing values output from the sensing diode 304b. These operations can be referred to as dark count offset calibration operations.

In some cases, a counter circuit as described herein can include a memory or buffer or similar analog or digital circuit that is configured to store one or more offset calibration values. For example, in a dark pixel calibration mode (or a dark count offset calibration mode), a counter circuit can be coupled to one or more masked SPADs for a specified period of time, during which impulses output from the one or more masked SPADs are counted by the counter circuit. Thereafter, these counts can be used as calibration values that may be subtracted from counts obtained by the same counter circuit from unmasked SPADs during an equivalent period of time. For example, if the calibration values were obtained over the course of 10 milliseconds (ms), the calibration values may be subtracted from counts obtained over 10 ms from unmasked SPADs. In other cases, unmasked SPADs may be sampled for a longer or shorter period of time than a corresponding calibration value. In these examples, the counter circuit and/or another circuit may be configured to subtract a sampling-period-normalized value from unmasked SPADs. For example, if an unmasked SPAD is sampled for 20 ms, a calibration value obtained over 10 ms may be subtracted twice. These examples are non-exhaustive; many configurations of a counter circuit, counting circuit, impulse counter, incrementor, pulse counter, or the like may be used.

Figure 3C:
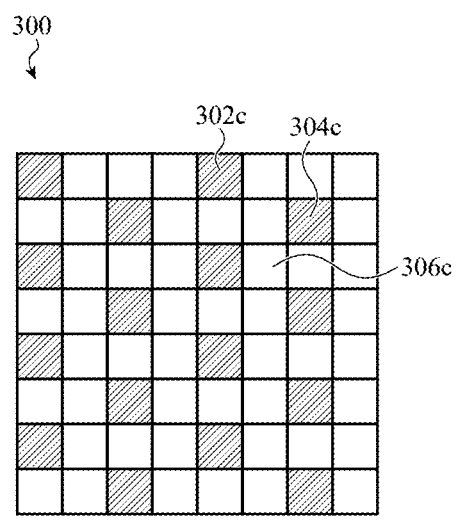

The embodiments shown and described in respect of FIGS. 3A-3B are not exhaustive. It may be appreciated that any suitable number of SPAD elements may be masked, with one or more different material layers and/or materials, to provide any suitable number of calibration values. FIG. 3C depicts a repeating pattern of masked SPAD elements, depicting a SPAD array 300 including the masked diode 302c, the masked diode 304c, and the sensing diode 306c. In this example, the masked diode 302c and the masked diode 304c can be binned together and/or used separately to calibrate output from one or more unmasked pixels, such as the sensing diode 306c.

For example, in some embodiments, multiple SPAD elements may be grouped together and a median value may be extracted therefrom as a representative sample. In other cases, a mean value may be used among a group of SPAD elements. In yet other examples, a highest value, a lowest value, a biased mean, or any other suitable statistical value may be used.

These foregoing embodiments depicted in FIGS. 3A-3C and the various alternatives thereof and variations thereto are presented, generally, for purposes of explanation, and to facilitate an understanding of various configurations and constructions of a SPAD array, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4A:
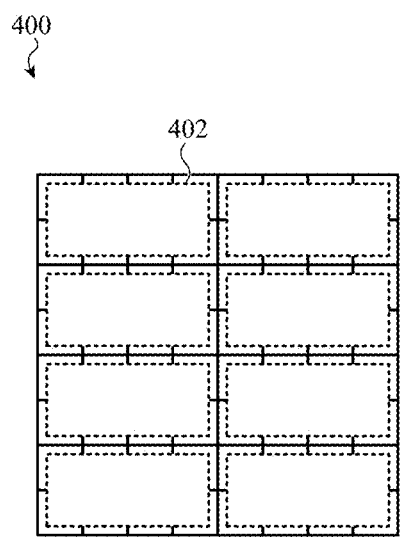
FIGS. 4A-4B depict additional example arrays of single photon avalanche detectors that can be used with an imaging subsystem of an input component as described herein.

For example, in some embodiments, multiple pixels of a SPAD array can be dynamically combined and/or digitally combined (e.g., binned) in order to increase sensitivity at the expense of spatial resolution. FIG. 4A depicts such a construction in which the SPAD array 400 includes a virtual pixel group 402 that combines values from eight independent SPAD pixels. Although the virtual pixel group 402 is depicted to include a rectangular M×N region of pixels (with M and N both being integers ≥1), a virtual pixel group may also include a group of pixels that form a non-rectangular region and/or multiple regions of pixels.

Figure 4B:
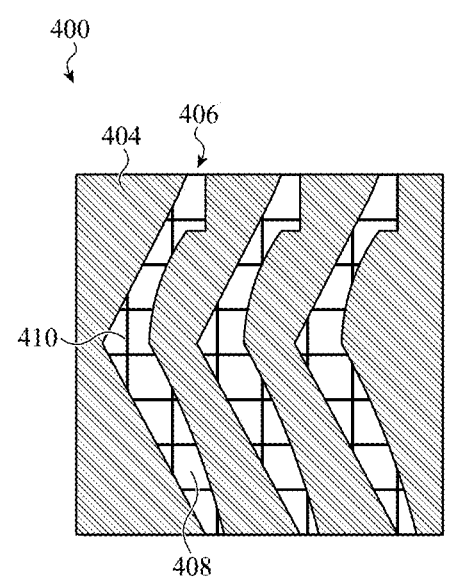

In other examples and embodiments, a masking layer (which may be metal, ink, or another material opaque to a wavelength of light emitted by a light emitting element) can be disposed over a SPAD array so as to expose a particular pattern over the array. For example, FIG. 4B depicts such a construction in which the SPAD array 400 has disposed on it a mask 404 that defines a particular pattern or series of apertures, one of which is identified as the mask aperture 406. In this example only portions of individual SPAD elements are exposed, such as the partially obstructed sensing diode 408 or the partially obstructed sensing diode 410. In other cases, some individual SPAD elements may be unobstructed while others are partially obstructed, while others are fully obstructed. This patterning can have the effect of reducing false counts/impulses by effectively reducing the sensing area of at least one exposed SPAD element. In a more simple phrasing, a reduction in sensing aperture size can result in an increase in the likelihood that an impulse/count output from a particular SPAD element is a true photon absorption event.

In some cases, exposed (partially or entirely) SPAD elements can be binned digitally or electronically so as to combine counts from multiple discrete sensors.

In some cases, the SPAD elements may be disposed with the same or different dimensions in X and Y relative to each respective light receiving surface thereof. Similarly, in some cases, certain SPAD elements can define different apertures, independent of whether such SPAD elements are otherwise digitally or electronically binned or grouped such as described above.

These foregoing embodiments depicted in FIGS. 4A-4B and the various alternatives thereof and variations thereto are presented, generally, for purposes of explanation, and to facilitate an understanding of various configurations and constructions of a SPAD array, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
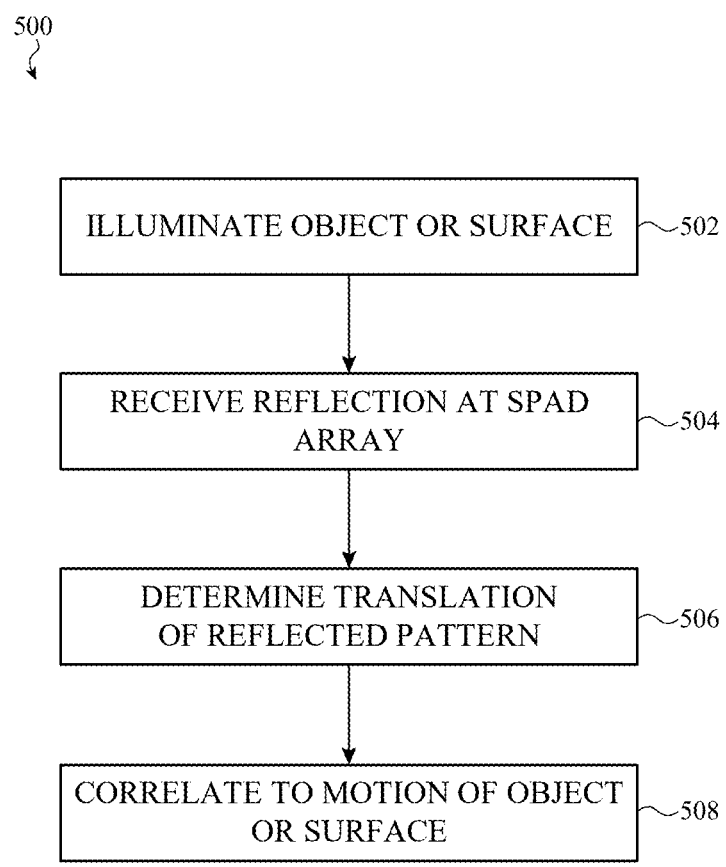
FIG. 5 is a flowchart including example operations of a method of operating an input component as described herein.

FIG. 5 is a flowchart including example operations of a method of operating an input component as described herein. The method 500 includes operation 502 at which a light emitting element can be used to illuminate an object or surface configured to move. The surface may be an external surface of a movable element of an input component (e.g., a crown that may be rotated or translated by a user), as described herein. At operation 504, a reflection from that surface can be detected at a SPAD array. The reflection may, as a result of the surface from which the reflection originated, be a speckle pattern, a specular reflection, a diffuse pattern, or any other suitable pattern. More simply, the reflection may locally vary in brightness or contrast according to surface features of the surface configured to move.

At operation 506, a frame-by-frame and/or pixel-by-pixel comparison (and/or correlation operation) can be performed to determine a translation of the pattern over time. At operation 508, the translation determined at operation 506 can be correlated to motion, orientation change, or any other adjustment or repositioning of the object or surface. In some cases, the operations of method 500 can be performed in a different order and/or with additional intervening operations and/or with multiple operations executing in parallel.

Figure 6:
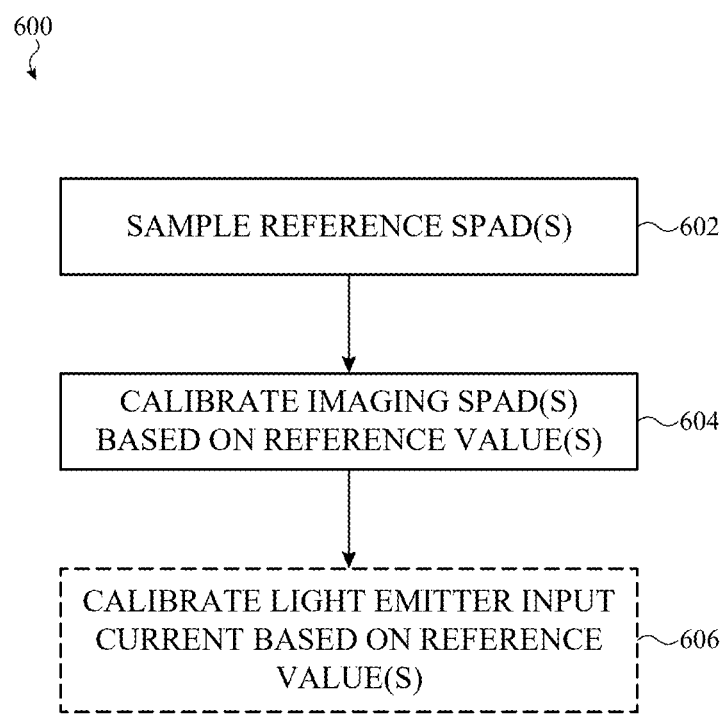
FIG. 6 is a flowchart including example operations of a method of calibrating an imaging subsystem as described herein.

FIG. 6 is a flowchart including example operations of a method of calibrating an imaging subsystem as described herein. The method 600 includes operation 602 at which a masked pixel (also referred to a darkened pixel) is sampled and/or output counts from the masked pixel are buffered for a time period. The time period(s) may vary from embodiment to embodiment and, additionally, the sampling periods may also vary from embodiment to embodiment, configuration to configuration, or otherwise. More particularly, in some cases, a select number of samples (each of which may collect counts in respect of one or more SPAD elements or element groups for a period of time, the "sampling period") may be buffered during a particular time period, after which the collected samples may be averaged, combined, or otherwise may be used to establish a count value in respect of the SPAD element(s) and the particular time period. These values, obtained by sampling darkened pixels, can be stored as a calibration value in respect of one or more exposed pixels. In some cases, the calibration value may be uniform for all SPAD elements, whereas in others, the calibration value may be associated with only adjacent or otherwise neighboring exposed SPAD elements. The calibration values may be stored in any suitable manner, including digital memory.

At operation 604, unmasked/exposed pixels can be calibrated based on the stored value. At operation 606, light output by a light emitting element can be increased or decreased to improve signal to noise ratio.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

As described herein, the term "memory" refers to any software and/or hardware-implemented data storage device or circuit physically and/or structurally configured to store data in a non-transitory or otherwise nonvolatile, durable manner. This term is meant to encompass memory devices, memory device arrays (e.g., redundant arrays and/or distributed storage systems), electronic memory, magnetic memory, optical memory, and so on.

What is claimed is:

1. An input component for a portable electronic device, the input component comprising:
    a movable input member comprising a shaft;
    a light emitting element oriented to emit light toward the shaft;
    a pattern disposed on a surface of the shaft and configured to reflect the emitted light as reflected light;
    an array of single-photon avalanche diodes (SPAD) configured to operate in Geiger mode; and
    a counter circuit coupled to at least one SPAD of the array of SPADs, the counter circuit configured to increment a value in response to an output of the at least one SPAD, the value:
        informing a determination of spatial phase of the reflected light; and
        corresponding to a rotation of the shaft of the movable input member.

2. The input component of claim 1, wherein:
    the at least one SPAD is a member of a group of SPADs selected from the array of SPADs; and
    the counter circuit is configured to iterate the value in response to each output of each member of the group of SPADs.

3. The input component of claim 2, comprising a mask disposed over at least a portion of the group of SPADs.

4. The input component of claim 3, wherein the mask partially overlaps the at least one SPAD.

5. The input component of claim 4, wherein:
    the at least one SPAD is a first SPAD; and
    the mask entirely covers a second SPAD of the group of SPADs.

6. The input component of claim 5, wherein:
    the value is a first value; and
    an imaging system is configured to use a second value output from the second SPAD as a calibration to modify the first value.

7. The input component of claim 3, wherein the mask comprises a metal layer disposed over the SPAD array.

8. The input component of claim 3, wherein the mask comprises a material opaque to the emitted light.

9. The input component of claim 1, wherein the value corresponds to a translation of the shaft of the movable input member.

10. An input component for a portable electronic device, comprising:
    a movable input member comprising a surface;
    a pattern defined on the surface;
    a light emitting element oriented to emit light toward the pattern such that the movable input member reflects the emitted light as reflected light; and
    an imaging system oriented to receive the reflected light and comprising:
        an array of single-photon avalanche diodes (SPAD) configured to operate in Geiger mode; and a counter circuit coupled to at least one SPAD of the array of SPADs, the counter circuit configured to iterate a value in response to an output of the at least one SPAD, the value:
informing a determination of spatial phase of the reflected light; and
the spatial phase corresponding to a movement of the movable input member.

11. The input component of claim 10, wherein the movement of the movable input member is a translation relative to a housing of the portable electronic device.

12. The input component of claim 10, wherein movement of the movable input member is a rotation relative to a housing of the portable electronic device.

13. The input component of claim 10, wherein movement of the movable input member is a tilt relative to a housing of the portable electronic device.

14. The input component of claim 10, wherein movement of the movable input member comprises at least two of a rotation, a tilt, or a translation relative to a housing of the portable electronic device.

15. The input component of claim 10, wherein the light emitting element emits infrared light.

16. An input component for a portable electronic device, the input component comprising:
a movable input member comprising a surface on which is defined a pattern;
a light emitting element oriented to emit light toward the pattern such that the pattern on the movable input member reflects the emitted light as reflected light;
an array of single-photon avalanche diodes (SPAD) biased to at least breakdown voltage; and
a circuit conductively coupled to the array of SPADs and configured to determine a spatial phase of the reflected light relative to the array of SPADs.

17. The input component of claim 16, wherein the array of SPADs is two-dimensional.

18. The input component of claim 16, wherein the array of SPADs extends along an axis of rotation of the movable input member.

19. The input component of claim 16, comprising a mask layer disposed over the array of SPADs.

20. The input component of claim 19, wherein the mask layer is formed from metal disposed over the array of SPADs.

* * * * *